United States Patent [19]

Fefferman

[11] 4,120,531
[45] Oct. 17, 1978

[54] VEHICLE CHAIR AND SEAT BELT ARRANGEMENT FOR CHAIR

[75] Inventor: Frank J. Fefferman, Burbank, Calif.

[73] Assignee: Stylar Industries, Inc., Burbank, Calif.

[21] Appl. No.: 748,064

[22] Filed: Dec. 6, 1976

[51] Int. Cl.² .............................................. A62B 35/00
[52] U.S. Cl. ..................................... 297/349; 297/385
[58] Field of Search ...................... 297/349, 385, 240; 248/425, 418, 415

[56] References Cited

U.S. PATENT DOCUMENTS

| | | | |
|---|---|---|---|
| 428,922 | 5/1890 | Lingle | 248/425 |
| 1,152,102 | 8/1915 | Kaufmann | 248/425 |
| 1,711,268 | 4/1929 | Kilburn | 248/425 X |
| 1,717,311 | 6/1929 | Brooks | 248/425 |
| 3,253,858 | 5/1966 | Degen | 297/349 X |
| 3,338,622 | 8/1967 | Bachmann | 297/349 X |
| 3,570,800 | 3/1971 | Cycowiez | 248/425 |
| 3,845,987 | 11/1974 | Bashford | 297/385 |
| 3,860,283 | 1/1975 | Colautti | 297/349 |

Primary Examiner—Francis K. Zugel
Attorney, Agent, or Firm—Lindenberg, Freilich, Hornbaker, Wasserman, Rosen & Fernandez

[57] ABSTRACT

A chair for a recreation vehicle or the like, wherein the chair must be allowed to swivel at least when the vehicle is stationary, and yet where the chair must be provided with a seat belt that is kept handy for use. The chair includes a pedestal with a round flange at the top, a seat assembly rotatably mounted on the pedestal, a coupling connected to the seat assembly to swivel with it and having a pedestal-engaging portion which extends under the circular flange of the pedestal, and a seat belt assembly fastened to the coupling. When the vehicle stops suddenly so that the coupling tends to move forward, the pedestal-engaging portion of the coupling is held by the pedestal to restrain the chair assembly and the occupant who is held by the seat belt assembly.

4 Claims, 5 Drawing Figures

VEHICLE CHAIR AND SEAT BELT ARRANGEMENT FOR CHAIR

BACKGROUND OF THE INVENTION

Recreation vehicles are often provided with swivel chairs which allow the occupant to swivel the seat. The chairs are normally provided with latches that can be used to lock the chair in a forward-facing direction when the vehicle is in motion, and are provided with seat belts that restrain the occupant and chair against forward movement in case of a crash. It would be possible to utilize strong large diameter swivel bearings of the type commonly available for heavy machinery, to prevent the seat assembly from breaking away from the pedestal and moving forward in a crash, but the cost of such bearings is very high. To minimize the cost of the seat apparatus, the seat belts can be fixed to the pedestal or to the floor of the vehicle, but the seat belts are then inconvenient to use because they then must be placed very low to prevent interference with swiveling of the seat. In addition, such seat belts do not directly restrain the seat, and therefore in a crash the force on the passenger may be not only the force on his body, but also the force on the seat which tends to propel it forward.

SUMMARY OF THE INVENTION

In accordance with one embodiment of the present invention, a vehicle chair arrangement of moderate cost is provided, which enables swiveling of the seat and of conveniently located seat belts, and yet which securely holds the seat and seat belts to the base or pedestal to restrain the seat and seat belts in case of a crash. The pedestal may be of a conventional type with bearings on the top for pivotally supporting the seat arrangement, and with a circular flange on the top. A coupling is provided which is fixed to the rear portion of the seat, and which has a pedestal-engaging portion that extends under the circular flange of the pedestal. In the event of a vehicle crash, the pedestal-engaging portion of the coupling which lies under the flange, holds the seat securely to the pedestal. In addition, seat belts are provided that are mounted on opposite ends of the coupling, so that forces applied to the seat belts are applied directly through the coupling to the pedestal. Since the coupling swivels with the seat, the seat belts are always located for convenient use by a person in the seat.

The novel features of the invention are set forth with particularity in the appended claims. The invention will be best understood from the following description when read in conjunction with the accompanying drawings.

BRIEF DESCRIPTION OF THE DRAWINGS

FIG. 3 is a view taken on the line 3—3 of FIG. 2;

DESCRIPTION OF THE PREFERRED EMBODIMENT

Figure 1:
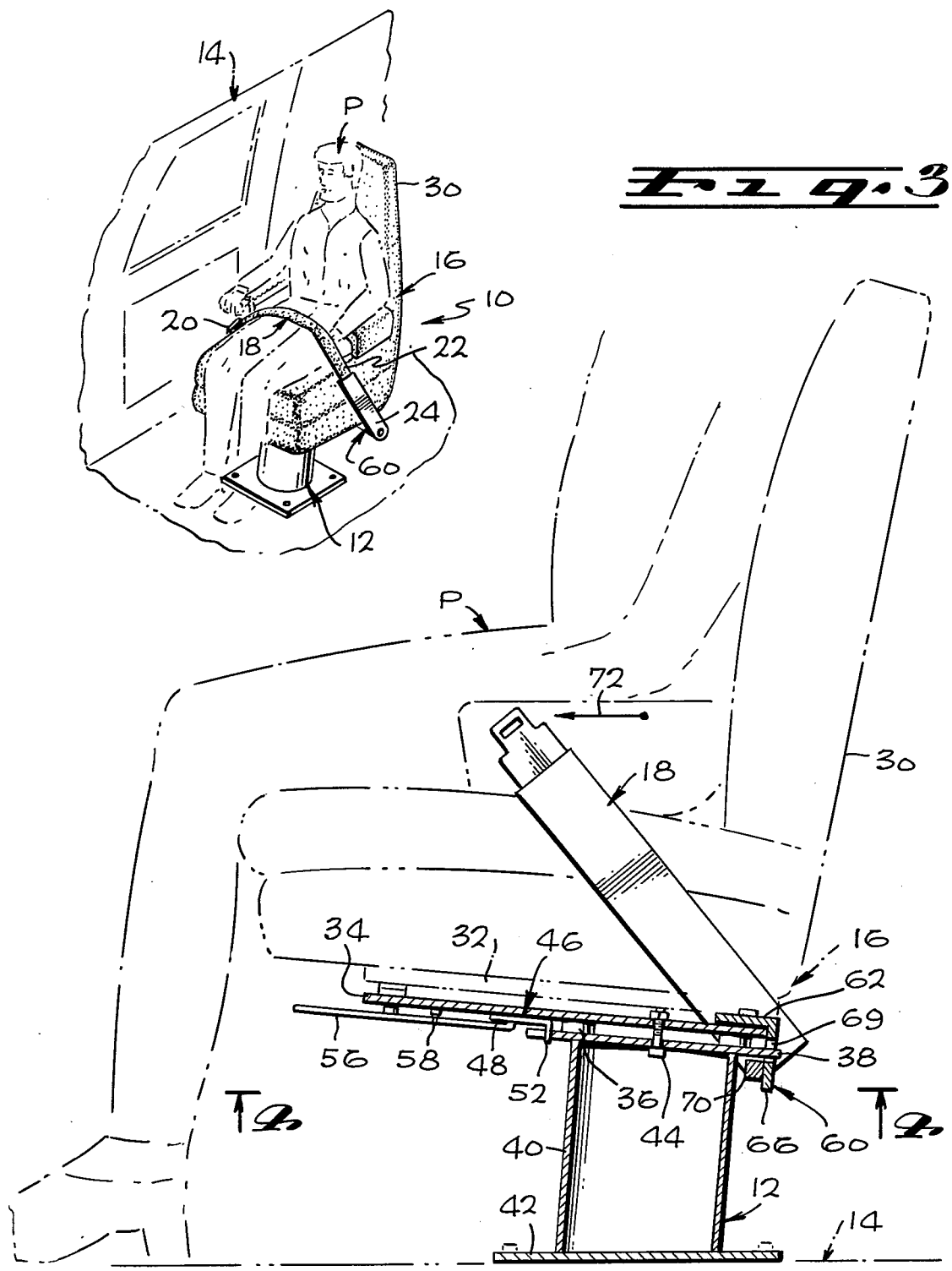
FIG. 1 is a front perspective view of a chair constructed in accordance with the present invention, shown mounted in a vehicle.

FIG. 1 illustrates a chair 10 of the present invention, which includes a pedestal-type base or pedestal 12 that is mounted on the floor of a recreation vehicle 14, and a seat assembly 16 which is pivotally mounted on the pedestal to enable a passenger P to swivel so as to face in any direction. Swiveling is usually performed when the vehicle is stationary, inasmuch as the passenger should face forwardly when the vehicle is in motion. A seat belt assembly 18 designed to hold the passenger when the vehicle is moving, includes a storage arm 20 which stores the belt 22 when it is not being used, and a latch arm 24 to which an end of the belt can be locked. Both of the seat belt arms 20, 24 are mounted so as to swivel with the seat assembly 16, so that the upper ends of the arms 20, 24 always lie beside the passenger to enable him to easily deploy the seat belt.

Figure 2:
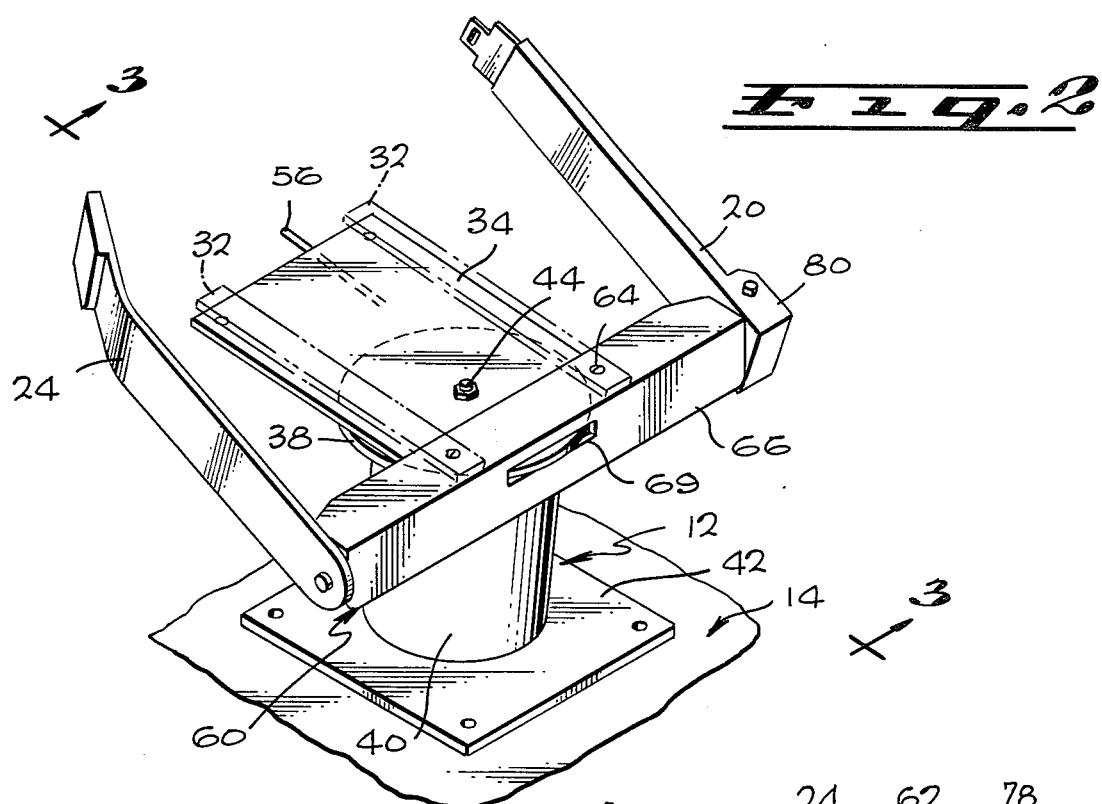
FIG. 2 is a rear perspective view of a portion of the chair of FIG. 1.
Figure 4:
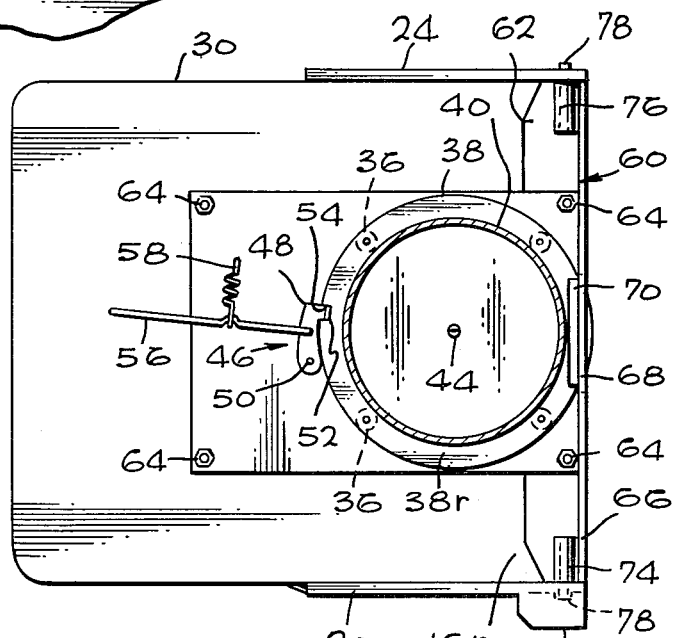
FIG. 4 is a view taken on the line 4—4 of FIG. 3.
Figure 5:
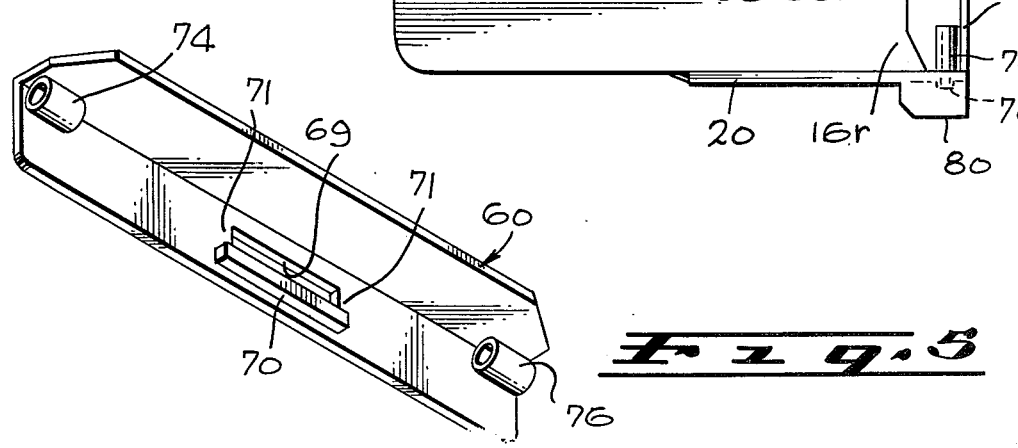
FIG. 5 is a perspective view of the coupling of FIG. 2.

FIGS. 2-4 illustrate details of the chair structure, and the manner in which the seat is mounted on the pedestal so as to permit swiveling of the seat and seat belt assembly, while also assuring that the seat and seat belt assembly will be held to the pedestal in the event of a crash. The seat assembly 16 includes a seat 30 which is mounted on conventional tracks 32 that permit the seat to slide a limited distance forward and backward, the tracks 32 being fixed to a seat mounting plate 34. The seat mounting plate 34 is rotatably mounted on a pedestal top plate 38 by pivotal mounting means in the form of a bolt 44 which extends through the two plates 34,38. The seat mounting plate is supported on the pedestal top plate by four bearing 36. The pedestal top plate 38 is welded to a pedestal column 40 which is supported on a base plate 42 that is, in turn, mounted on the floor of the vehicle. The bearings 36 are discs of moderately high friction, such as glass reinforced graphite, to allow the seat mounting plate 34 and the seat hold thereon to swivel with respect to the pedestal.

A lock apparatus 46 (FIG. 4) is provided to lock the seat in a forward-facing direction. The lock apparatus includes a latch lever 48 pivotally mounted at 50 on the underside of the seat mounting plate 34, and having a tongue 52 that can enter a corresponding slot 54 in the rim of the pedestal top plate. A handle 56 biased by a spring 58, enables a passenger to reach under the seat to move the handle to one side so as to unlock the seat so it can swivel, the seat automatically locking when the seat swivels to the forward-facing orientation.

In accordance with the present invention, a coupling 60 is provided which can securely hold the seat mounting plate 34 and the seat 30 mounted thereon, to the pedestal 12 in the event of a crash of the vehicle. The coupling 60 which is mounted on the rear portion 16r of the seat assembly, is of generally L-shaped cross-section with an upper leg 62 lying on top of the seat mounting plate 34 and fastened thereto by fasteners 64, and with a second leg 66 which has a pedestal-engageable portion 68 which extends under the flange or rim portion 38r of the pedestal top plate. The second leg 66 has a slot 69 which receives the circular rim portion 38r of the pedestal top plate. An elongated member or bar 70, forms part of the pedestal-engageable portion 68 of the coupling, serves to securely engage the underside of the rim pedestal top plate and the column of the pedestal at a location under the rear portion of the seat. The center of the coupling with the bar 70 thereon, has a substantially C-shaped cross-section, with the bar forming one leg of the C.

When the vehicle is involved in a crash which tends to propel the seat 30 forwardly, and the seat is in the proper forward-facing orientation the coupling 60 serves to securely hold the seat to the pedestal. The forwardly-directed forces on the seat 30 are transmitted to the seat mounting plate 34 and to the coupling 30 to move the coupling 30 forwardly. The bar 70 of the pedestal-engageable portion 68 of the coupling then moves against the pedestal column 40 to transmit forces received from the seat against the pedestal column. The large diameter pedestal column 40 can withstand large forces applied by the bar 70 thereagainst. The slot 69 in the coupling is made long enough to allow the bar 70 to press against the pedestal column, and to allow the ends 71 of the walls of the coupling to press against the flange rim 38r especially if the coupling bends under the forces of a crash. The center of gravity of the seat 30 and of the passenger P sitting in the seat, lies considerably over the pedestal so that forces are applied as indicated by the arrow 72. The combination of forward forces applied to the seat assembly 16 at arrow 72, which are resisted by rearward forces applied to the bar 70, results in a turning moment tending to push the front of the seat apparatus down with great force against the forward portion of the column 40 and to lift up the coupling 60. However, the pedestal-engaging portion 68 of the coupling which lies under the rim of the pedestal top plate 38, resists such upward force. Of course, the bolt 44 which rotatably connects the seat assembly to the pedestal, can withstand some forward force, but the coupling 60 provides considerable additional restraint to provide safety in the event of a crash. Prior to any deformation of the bolt 44, the coupling 60 does not contact the pedestal and therefore does not interfere with smooth swivelling of the seat assembly. Only when the bolt 44 is bent or begins to shear off, does the coupling make contact with the pedestal.

The seat belt assembly 18 is connected to the coupling 60, with the lower-rearward ends of the two seat belt arms 20, 24 which form seat belt mounting portion, being fixed to opposite ends of the coupling 60. To facilitate such mounting, a pair of short pipe-like mounting members 74, 76 are welded to opposite ends of the L-shaped coupling 60 at the inside of the corner thereof. The two mount members 74, 76 are internally threaded, so that each seat belt arm can be pivotally held to the coupling by a corresponding bolt 78. Each of the seat belt arms 20, 24 can be swung to a position where their ends lie approximately at seat level, so that the passenger can pull out the seat belt 18 from one of the arms 20 which has an inertia reel 80, to fasten the belt end to a connector at the forward end of the other arm 24. It would be possible to connect the seat belt assembly to the seat 30 or to the seat mounting plate 34, instead to directly to the coupling 60. However, direct connection to the coupling 60 provides a direct and therefore more reliable connection of the seat belt assembly to the pedestal. It may be noted that even if a passenger does not observe safety rules and swivels the seat toward one side, the coupling 60 can still help to restrain the seat.

Thus, the invention provides a vehicle chair assembly which can function as a swivel chair when the vehicle is stopped, which provides seat belts conveniently available to the passenger at any swivel position and which holds the seat and seat belts securely to the pedestal in the event of a crash. This can be accomplished using conventional seat assemblies and pedestals, by the addition of a coupling of relatively low cost. The coupling is attached to the seat and preferably also to the seat belt assembly, and has a pedestal-engaging portion which is located under the rear portion of the seat and which extends under a circular flange formed on the pedestal. Accordingly, when the seat belt assembly and chair are suddenly thrust forward as in a crash, the coupling can engage the pedestal to restrain the seat belt assembly and seat.

Although particular embodiments of the invention have been described and illustrated herein, it is recognized that modifications and variations may readily occur to those skilled in the art and consequently it is intended that the claims be interpreted to cover such modifications and equivalents.

What is claimed:

1. A chair comprising:
a chair pedestal having a lower end for mounting on a floor and an upper end with an outwardly-extending flange;
a seat assembly rotatably mounted on said pedestal to swivel thereon, said seat assembly having forward and rearward parts;
a coupling member connected to said seat assembly to swivel with it, said coupling having a pedestal-engageable portion with-opposite ends, lying at the rearward part of said seat assembly and extending under said flange, for engaging said pedestal to prevent forward movement of the coupling in an emergency; and
a seat belt assembly which includes a seat belt which can extend around the front of said seat sssembly to hold a person therein, said seat belt assembly having opposite mounting portions attached to locations on said coupling which lie at said opposite ends of said pedestal-engageable portion of said coupling, whereby to provide secure holding of the seat belt assembly.

2. A chair comprising:
a chair pedestal having a column with a lower end mountable to a floor and an upper end, said pedestal also having a top plate mounted on the top of said column;
a seat assembly rotatably mounted on said top plate to swivel thereon, said seat assembly having forward and rearward parts; and
a coupling connected to said seat assembly to swivel with it, said coupling having a column-engageable portion lying at the rearward part of said seat assembly and extending to a level below the top of said column, whereby to directly engage said column in the event of a collision.

3. The chair described in claim 2 including:
a seat belt assembly for extending over a person in said seat assembly to hold him therein in the event of a collision, said seat belt assembly having a pair of opposite mounting portions attached to said coupling.

4. The chair described in claim 2 wherein:
said top plate has a substantially circular rim extending outwardly beyond the top of said column; and
said coupling comprises an elongated member with a center portion of substantially C-shaped cross section forming a first leg fastened to said seat assembly, a second leg extending downwardly across said rim of said pedestal top plate and having a slot through which said rim extends, and a third leg extending substantially parallel to said first leg and lying under said rim and immediately behind said column.

* * * * *